United States Patent [19]

Profera

[11] 4,122,453

[45] Oct. 24, 1978

[54] ANTENNA FEED NETWORK

[75] Inventor: Charles Edward Profera, Cherry Hill, N.J.

[73] Assignee: RCA Corporation, New York, N.Y.

[21] Appl. No.: 858,854

[22] Filed: Dec. 8, 1977

[51] Int. Cl.² .............................................. H04B 7/00

[52] U.S. Cl. .............................. 343/100 SA; 343/854

[58] Field of Search ................. 343/100 SA, 854, 101, 343/5 R

[56] References Cited

PUBLICATIONS

C. J. Sletten, Reflector Antennas, Chap. 17, *Antenna Theory Part* 2, McGraw Hill, 1969, pp. 60, 61.

S. K. Buchmeyer, Corrugations Lock Horns with Poor Beamshapes, Microwaves, Jan. 1973, p. 44.

*Primary Examiner*—Theodore M. Blum

*Attorney, Agent, or Firm*—H. Christoffersen; Joseph D. Lazar

[57] ABSTRACT

A distribution network provides signals that are representative of the sum of the amplitudes of values of the first, second and third terms of a Fourier cosine series expansion of the discrete inverse Fourier transform of a desired pattern of excitation of a purality of radiators. The signals are coupled to an orthogonal beam matrix via a plurality of phase shifters to provide a signal representation of an approximation of the inverse transform. The matrix is connected to the radiators whereby the desired pattern of excitation is applied to the radiators.

3 Claims, 4 Drawing Figures

ANTENNA FEED NETWORK

The Government has rights in this invention pursuant to Contract No. F30602-76-C-0290 awarded by the Department of the Air Force.

CROSS REFERENCE TO RELATED APPLICATIONS

Of interest are the following pending U.S. applications: Ser. No. 842,079, filed on Oct. 14, 1977, entitled, "Antenna Feed System," based on the invention of the instant inventor; and Ser. No. 842,080, filed on Oct. 14, 1977, entitled, "Paraboloid Reflector Antenna," based on the invention of Leonard H. Yorinks and Robert M. Scudder.

BACKGROUND OF THE INVENTION

1. Field of the Invention

This invention relates to microwave propagation and more particularly to an antenna feed network for a radar.

2. Description of the Prior Art

When an antenna of a radar is comprised of a plurality of radiators, it may be desirable to excite the radiators in a selected one of a group of patterns of excitation. When, for example, the radar is used for tracking a target within a spatial region, it is desirable that the antenna provide a narrow, high gain tracking beam. The tracking beam is typically provided by applying excitation to a selected one of the radiators.

When the radar is used for searching for a target, it is desirable that a return signal from the target have a signal strength independent of the altitude of the target. The return signal is independent of the altitude when the intensity of the beam is proportional to the cosecant of the angle of elevation of the target (referred to in the art as a cosecant square beam). Typically, the cosecant square beam is provided in response to excitation being concurrently applied to all of the radiators.

A feed circuit for providing a selected one of a plurality of patterns of excitation may be comprised of what is alternatively known as an orthogonal beam matrix or a Butler matrix. The orthogonal beam matrix provides a pattern of excitation in response to inverse transform signals representative of the discrete inverse Fourier transform of the pattern.

The excitation of one of the radiators is predicated upon the inverse discrete Fourier transform of a unit impulse being a rectangular pulse. Therefore, when all of the signals applied to the orthogonal beam matrix are of equal amplitude, (a discrete signal representation of a rectangular pulse) excitation is applied to a single radiator (a discrete signal representation of a unit impulse). For similar reasons, excitation that causes the cosecant square beam is provided in response to the inverse transform signals being representative of values of a function that is similar to a biased cosine square function.

Heretofore, a simple network for applying alternative excitations to the radiators has been unknown in the art.

SUMMARY OF THE INVENTION

According to the present invention, a group of signals representative of the amplitudes of the first three terms of a Fourier cosine series expansion of a discrete inverse Fourier transform of a desired pattern of excitation of a plurality of radiators are respectively applied to a plurality of phase shifters that are coupled to the radiators through an orthogonal beam matrix. The phase shifters cause the group of signals to have relative phase shifts corresponding to the relative phase shifts between values of the discrete inverse Fourier transform, whereby the desired pattern of excitation is applied to the radiators.

DESCRIPTION OF THE PREFERRED EMBODIMENT

Figure 1:
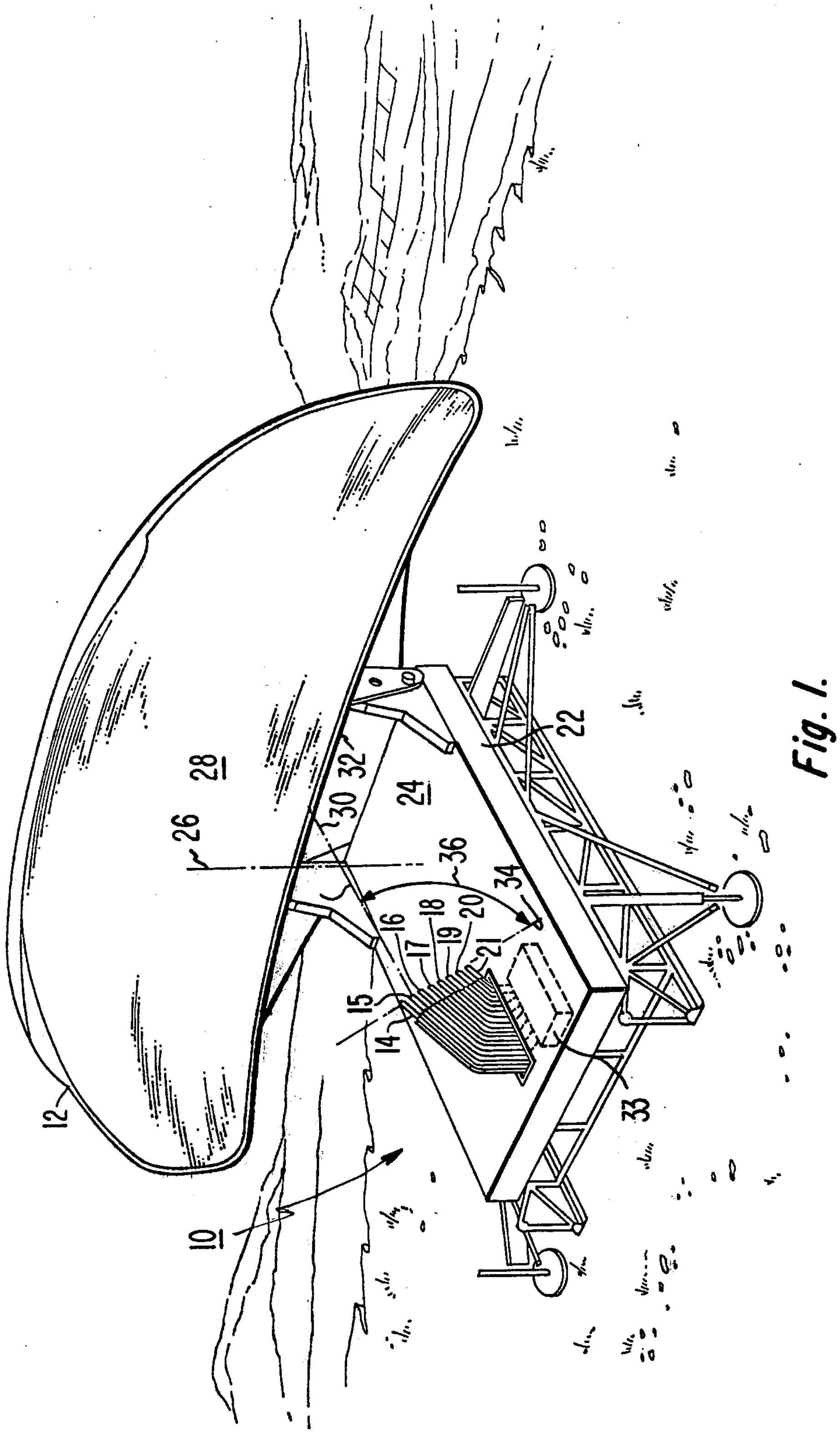
FIG. 1 is a pictorial view of the preferred embodiment of the present invention.

As shown in FIG. 1, a mobile radar antenna 10 includes a reflector 12 and radiators 14–21 that are supported by a platform 22 which rests upon the ground. Reflector 12 and radiators 14–21 are disposed upon a horizontal table 24 of platform 22. Table 24 is rotatable about an azimuth axis 26. Because table 24 is rotatable, when a beam is transmitted from antenna 10, it is within an elevation sector that has an azimuth angle which is selected by rotating table 24 about axis 26.

Reflector 12 has a reflecting surface 28 that is part of a parabollic surface of revolution about an axis 30 which passes through a lower edge 32 of reflector 12. Radiators 14–21 are positioned in a vertical plane with radiator 15 disposed substantially at the focal point of surface 28.

Radiators 14–21 are excited by a transmitter via a microwave feed circuit 33 in accordance with one of two types of patterns. One type of pattern of excitation causes substantially all of the electromagnetic wave energy from the transmitter to emanate from one of radiators 14–21. The other type of pattern of excitation causes the wave energy to emanate from all of radiators 14–21. Moreover, when the wave energy emanates from all of radiators 14–21, antenna 10 transmits a beam that has an intensity which is an approximation of a cosecant square function of the angle of elevation of any given location within the elevation sector.

When the wave energy emanates from one of radiators 14–21, it propagates to surface 28 and is reflected therefrom, whereby a high gain beam is transmitted from antenna 12 into the elevation sector. The high gain beam is transmitted at an angle of elevation related to the position of the one of radiators 14–21 where excitation is applied.

Radiators 14–21 are positioned along a line 34 that subtends an angle 36 from axis 30. Angle 36 is in accordance with a relationship which is give as:

$$\phi = \arctan(4f/y) \tag{1}$$

where $\phi$ is angle 36;

$f$ is the focal length of surface 28; and $y$ is a distance of axis 30 from a top edge of surface 28.

Because radiators 14–21 are disposed along line 34, the wave energy reflected from surface 28 forms a transmitted beam that is focused in azimuth.

Figure 2:
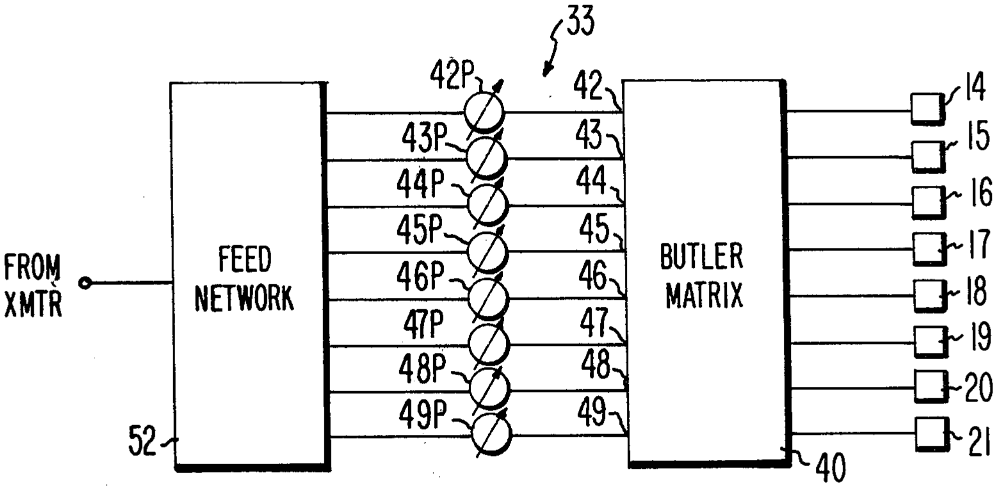
FIG. 2 is a block diagram of a network that drives radiators in the embodiment of FIG. 1.

As shown in FIG. 2, radiators 14–21 are connected to outputs of an orthogonal beam matrix 40 of circuit 33. Matrix 40 has input ports 42–49 where an input signal representation of an inverse discrete Fourier transform of a selected one of the patterns of excitation (referred to as inverse transform signals hereinafter) is applied. As known to those skilled in the art, in response to the inverse transform signals, matrix 40 applies the selected pattern of excitation to radiators 14–21.

More particularly, the pattern of excitation applied to radiators 14–21 is in accordance with a transform relationship which is given as:

$$b_n = \frac{1}{8} \sum_{m=14}^{21} a_m e^{j\phi(m,n)} \quad (2)$$

where $n$ is a reference number of an input port of matrix 40;

$m$ is a reference number of a radiator;

$b_n$ is the amplitude of a signal applied to an input port having the reference number $n$;

$a_m$ is the amplitude of a signal provided to a radiator having the reference number $m$;

$$\phi(m,n) = \delta_m (n - 41 - \frac{9}{2});$$

and $$\delta_m = \frac{\pi}{4} (\frac{9}{2} - m - 13)$$

Input ports 42–49 are connected to a feed network 52 through reciprocal phase shifters 42P–49P, respectively. As explained hereinafter feed network 52 provides a signal representation of the amplitude of the inverse discrete Fourier transform. Phase shifters 42P–49P are connected to a computer (not shown) that provides a signal representation of phase shifts of the inverse transform signals. In concurrent response to the signal representation of the phase shifts and the feed signals, phase shifters 42P–49P provide the inverse transform signals to ports 42–49. Reciprocal phase shifters are well known in the art.

Figure 3:
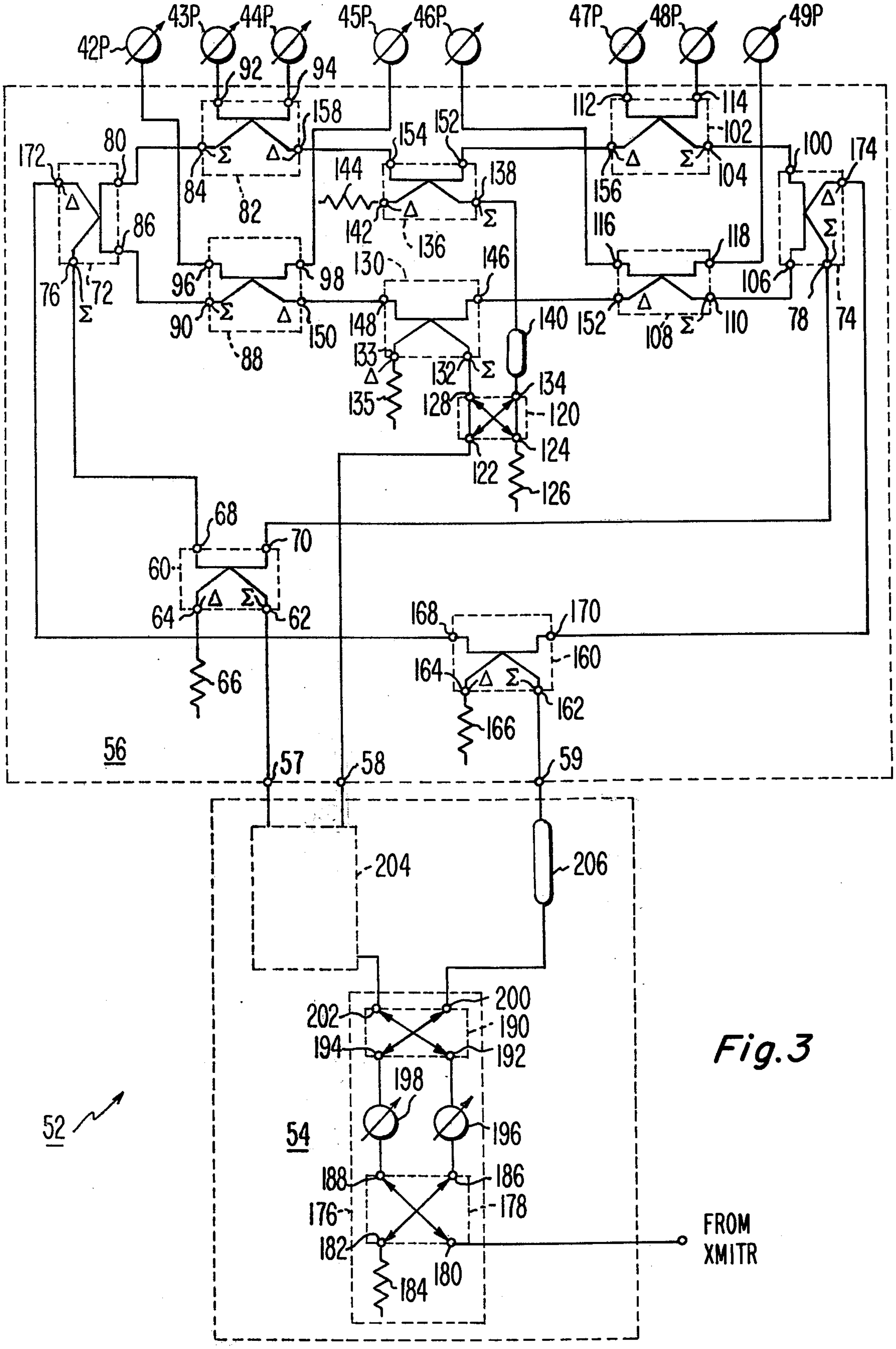
FIG. 3 is a schematic diagram of a feed network of FIG. 2.

As shown in FIG. 3, network 52 is comprised of a three way variable power divider 54 that is connected to a distribution network 56. Three way divider 54 provides first, second and third excitation signals of any desired relative amplitudes to ports 57, 58 and 59, respectively, of distribution network 56.

As explained hereinafter, the feed signals are a summation of first term, second term and third term signals that are respectively representative of the first, second and third terms of a Fourier cosine series expansion of the amplitude of the inverse transform. In response to the first excitation signal, the first term signals are applied to phase shifters 42P–49P. Similarly, in response to the second and third excitation signals, the second term signals and the third term signals are applied to phase shifters 42P–49P. The first three terms of the Fourier cosine series have a form which is given as:

$$f(\theta) = k_0 + k_1 \cos 2\theta + k_2 \cos 4\theta \quad (3)$$

where $\theta$ is an angle that identifies the location of one of radiators 14–21; and $k_0$, $k_1$ and $k_2$ are constant coefficients.

To provide the first term signals, port 57 is connected to a magic TEE network 60 at a sum port 62, whereby the first excitation signal is applied to sum port 62. A difference port 64 of magic TEE 60 is connected to a termination resistor 66, whereby no signal is applied to difference port 64. Additionally, signal ports 68 and 70 of magic TEE 60 are respectively connected to magic TEE networks 72 and 74 at sum ports 76 and 78.

As known to those skilled in the art, signals at sum and difference ports of a magic TEE network are proportional to the sum and the difference, respectively, of signals at a pair of signal ports of the magic TEE network. Accordingly, in response to the first excitation signal, cophased signals of equal amplitude are provided by signal ports 68 and 70 and applied to sum ports 76 and 78, respectively. It should be understood that a magic TEE network is substantially lossless.

Signal ports 80 and 86 of magic TEE 72 are respectively connected to a magic TEE network 82 at a sum port 84 and to a magic TEE 88 at a sum port 90. Additionally, magic TEE 82 has signal ports 92 and 94 connected to phase shifters 43P and 44P, respectively. Similarly, magic TEE 88 has signal ports 96 and 98 connected to phase shifters 42P and 45P, respectively.

The signal applied to sum port 76 causes cophased signals of equal amplitude to be provided at signal ports 80 and 86 and applied to sum ports 84 and 90. In response to the signals applied to sum ports 84 and 90, first term signals that are cophased and of equal amplitude are provided at signal ports 96, 92, 94 and 98 and applied to phase shifters 42P–45P.

Figure 4:
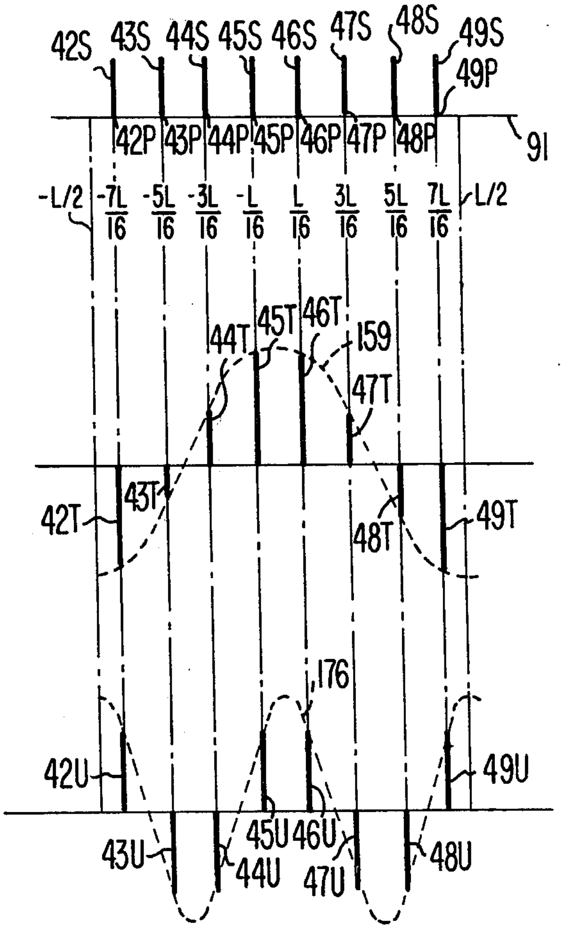

As shown in FIG. 4, illustration (*a*), the first term signals applied to phase shifters 42P–45P are represented by evenly spaced signal vectors 42S–45S; that have coordinates on an abscissa 91 which has a range of interest from an abscissa coordinate, $$-\frac{L}{2},$$

to an abscissa coordinate, $$\frac{L}{2}.$$

Moreover, the abscissa coordinates of vectors 42S–45S are $$-\frac{7L}{16}, -\frac{5L}{16}, -\frac{3L}{16} \text{ and } -\frac{L}{16},$$

respectively, on abscissa 91. It should be understood that phase shifters 42P–45P correspond, respectively, to coordinates $$-\frac{7L}{16}, -\frac{5L}{16}, -\frac{3L}{16} \text{ and } -\frac{L}{16}.$$

Corresponding to signal ports 80 and 86 (FIG. 3), signal ports 100 and 106 of magic TEE 74 are respectively connected to a magic TEE network 102 at a sum port 104 and to a magic TEE 108 at a sum port 110. Additionally, magic TEE 102 has signal ports 112 and 114 connected to phase shifters 47P and 48P, respectively. Similarly, magic TEE 108 has signal ports 116 and 118 connected to phase shifters 46P and 49P, respectively.

The signal applied to sum port 78 causes cophased signals of equal amplitude to be applied to sum ports 104 and 110. In response to the signals applied to sum ports 104 and 110, first term signals that are cophased and of equal amplitude are provided at signal ports 116, 112, 114 and 118 and applied to phase shifters 46P–49P.

The first term signals applied to phase shifters 46P–49P are represented as evenly spaced signal vectors 46S–49S (FIG. 4, illustration (*a*)). Moreover, vectors 46S–49S have coordinates $$\frac{L}{16}, \frac{3L}{16}, \frac{5L}{16}, \text{and } \frac{7L}{16},$$

respectively. Phase shifters 46P–49P correspond, respectively, to coordinates $$\frac{L}{16}, \frac{3L}{16}, \frac{5L}{16} \text{ and } \frac{7L}{16}.$$

It should be understood that because signals of equal amplitude are applied to sum ports 76 and 78, all of the first term signals are of equal amplitude. Hence, all of vectors 42S–49S are of equal amplitude.

Since a magic TEE network is substantially lossless, when power associated with the first excitation signal is applied to sum port 62, a substantially equal amount of power is provided to phase shifters 42P–49P. Moreover, the power provided to each of phase shifters 42P–49P is equal because the first term signals are of equal amplitude. Since power is proportional to the square of signal amplitude, the first term signals are in accordance with a first power relationship which is given as:

$$\int_{-\frac{L}{2}}^{\frac{L}{2}} E_o^2\, dX = A_o^2 \quad (4)$$

where $E_o$ is the amplitude of the signals of equal amplitude applied to phase shifters 42P–49P;

$A_o$ is the amplitude of the first excitation signal; and $X$ is a coordinate on abscissa 91.

The value of the amplitude, $E_o$, is determined by solving the first power relationship, (4), whereby:

$$8\, E_o^2 = A_o^2 \quad (5)$$

Therefore, $E_o = A_o/\sqrt{8}$ (5*a*)

Since the first excitation signal causes first term signals that have an amplitude represented by the term (5*a*), $A_o/\sqrt{8}$, to be applied to each of phase shifters 42P–49P, the term (5*a*), $A_o/\sqrt{8}$, is the first term of the Fourier cosine series.

As shown in FIG. 4, illustration (*b*), the second term signals, which are provided in a manner explained hereinafter, are represented by vectors 42T–49T. Vectors 42T–49T are connected by a broken line representative of values of one cycle of a second term sinusoid. The second term sinusoid is in accordance with a second term relationship which is given as:

$$F_1(X) = E_1 \cos(2\pi X/L) \quad (6)$$

where $E_1$ is a constant coefficient.

It should be understood that vectors 42T–49T are located where the term, $2\pi X/L$, is equal to angles of either ±22.5°, ±66.5°, ±112.5° or ±152.5°. In other words, vectors 42T–49T are located where the term, $2\pi X/L$, represents a principal angle of either 22.5° or its compliment, 66.5°. Therefore, vectors 42T–49T are proportional to either sin 66.5° or cos 66.5°. Moreover, the second term sinusoid is a representation of the second term of the Fourier cosine series.

To provide the second term signals, port 58 is connected to a directional coupler 120 at a first input port 122, thereby causing the second excitation signal to be applied to directional coupler 120. A second input port 124 of directional coupler 120 is connected to a termination resistor 126, whereby no signal is applied to second input port 124.

A first output port 128 of directional coupler 120 is connected to a magic TEE network 130 at a sum port 132, thereby causing a signal provided at first output port 128 to be applied to sum port 132. A difference port 133 of magic TEE 130 is connected to a termination resistor 135, whereby no signal is applied to difference port 133.

A second output port 134 of directional coupler 120 is connected to a magic TEE network 136 at a sum port 138 through a delay line 140, thereby causing a signal provided at second output port 134 to be coupled to sum port 138 via delay line 140. A difference port 142 of magic TEE 136 is connected to a termination resistor 144 whereby no signal is applied to difference port 142.

An exemplary directional coupler is a substantially lossless circuit element where signals at input and output ports thereof are in accordance with transfer relationships which are given as:

$$V_{01} = C \sin \omega t\, [V_{i1} \sin \phi + V_{i2} \cos \phi] \quad (7)$$
$$V_{02} = C \cos \omega t\, [V_{i1} \cos \phi + V_{i2} \sin \phi] \quad (8)$$

where $V_{i1}$ is a signal applied to a first input port of the exemplary directional coupler;

$V_{i2}$ is a signal applied to the second input port of the exemplary directional coupler;

$C$ is a constant;

$\omega$ is the natural frequency of the signal applied to the input ports of the exemplary directional coupler;

$t$ is the variable, time;

$V_{01}$ is the signal provided at a first output port of the exemplary directional coupler;

$\phi$ is a constant established by the construction of the exemplary directional coupler; and $V_{02}$ is the signal provided at a second output port of the exemplary directional coupler.

Directional coupler 120 is constructed to provide signals in accordance with the transfer relationships (7) and (8) where the constant, $\phi$, is 62.5° for reasons explained hereinafter.

From the transfer relationships (7) and (8), it should be understood that the signal provided at first output port 128 is in phase with the second excitation signal and 90° out of phase with the signal provided at second output port 134. However, delay line 140 provides a phase delay that causes the signal applied to sum port 138 to be cophased with the signal provided by first output port 128. Accordingly, the second excitation signal and the signals applied to sum ports 132 and 138 are all cophased.

In response to the signal provided at first output port 128, magic TEE 130 provides cophased signals of equal amplitude at signal ports 146 and 148. Signal ports 146 and 148 are connected to a difference port 150 of magic TEE 88, and a difference port 152 of magic TEE 108, respectively. Therefore, the cophased signals of equal amplitude provided at signal ports 146 and 148 are applied to difference ports 152 and 150, respectively.

The signal applied to difference port 150 causes second term signals of equal amplitude and opposite phase to be provided at signal ports 96 and 98 and respectively applied to phase shifters 42P and 45P. Similarly, the signal applied at difference port 152 causes second term signals of equal amplitude and opposite phase to be provided at signal ports 116 and 118 and respectively applied to phase shifters 46P and 49P.

The second term signals applied to phase shifters 42P and 45P are represented by signal vectors 42T and 45T, respectively (FIG. 4, illustration (*b*)). Correspondingly, the second term signals applied to phase shifters 46P and 48P are represented by signal vectors 46T and 49T, respectively. It should be understood that because the angle, $\phi$, is 62.5° for directional coupler 120, the amplitude of vectors 42T, 45T, 46T and 49T is proportional to the sin 62.5°.

In response to the signal provided at second output port 134 (FIG. 3), magic TEE 136 provides cophased signals of equal amplitude at signal ports 152 and 154. Signal ports 152 and 154 are connected to a difference port 156 of magic TEE 102 and a difference port 158 of magic TEE 82, respectively. Therefore, the cophased signals of equal amplitude provided at signal ports 152 and 154 are applied to difference ports 156 and 158, respectively.

The signal provided at difference 156 causes second term signals of equal amplitude and opposite phase to be provided at signal ports 112 and 114 and respectively applied to phase shifters 47P and 48P. Similarly, the signal applied at difference port 158 causes second term signals of equal amplitude and opposite phase to be provided at signal ports 92 and 94 and respectively applied to phase shifters 43P and 44P.

The second term signals applied to phase shifters 47P and 48P are represented by signal vectors 47T and 48T, respectively (FIG. 4, illustration (*b*)). Correspondingly, the second term signals applied to phase shifters 43P and 44P are represented by signal vectors 43T and 44T, respectively. Because the angle, $\phi$, is 62.5° for directional coupler 120, the amplitude of vectors 43T, 44T, 47T, 48T is proportional to the cos 62.5°.

Since a directional coupler and a magic TEE network are both substantially lossless, when power associated with the second excitation signal is applied to first input port 122, a substantially equal amount of power is provided to phase shifters 42P–49P. Hence, the second term signals are in accordance with a second power relationship which is given as:

$$\int_{-\frac{L}{2}}^{\frac{L}{2}} E_1^2 \cos^2 \frac{2\pi X}{L}\, dX = A_1^2 \tag{9}$$

where $A_1$ is the amplitude of the second excitation signal; and $E_1$ is a constant coefficient.

The value of the coefficient, $E_1$, is determined by solving the second power relationship (9), whereby:

$$E_1 = A_1/2 \tag{10}$$

By substituting the term, $A_1/2$, for the coefficient, $E_1$, in the second term relationship (6), the second term of the Fourier cosine series is alternatively given as:

$$F_1(X) = (A_1/2) \cos (2\pi X/L) \tag{11}$$

As shown in FIG. 4, illustration (*c*), the third term signals, which are provided as explained hereinafter, are represented by vectors 42U–49U. Vectors 42U–49U are connected by a broken line representative of values of two cycles of a third term sinusoid. The third term sinusoid is in accordance with a third term relationship which is given as:

$$F_2(X) = E_2 \cos (4\pi X/L) \tag{12}$$

where $E_2$ is a constant coefficient.

It should be understood that vectors 42U–49U are located where the term, $4\pi X/L$, represents a principal angle of 45°. Therefore, vectors 42U–49U are of equal amplitude. Moreover, the third term sinusoid is a representation of a third term of the Fourier cosine series.

To provide the third term signals, port 59 is connected to a magic TEE network 160 at a sum port 162 thereby causing the third excitation signal to be applied to magic TEE 160. A difference port 164 of magic TEE 160 is connected to a termination resistor 166, whereby no signal is applied to difference port 164. Additionally, signal ports 168 and 180 are connected to a difference port 172 of magic TEE 72 and to a difference port 174 of magic TEE 74, respectively. Accordingly, in response to the third excitation signal, cophased signals of equal amplitude are provided at signal ports 168 and 170 and applied to difference ports 172 and 174, respectively.

The signal applied to difference port 172 causes signals of equal amplitude and opposite phase to be provided at signal ports 80 and 86 and applied to sum ports 84 amd 90, respectively. Because the signals applied to sum ports 84 and 90 are of opposite phase, third term signals of one phase are applied to phase shifters 42P and 45P via signal ports 96 and 98, respectively; third term signals of an opposite phase are applied to phase shifters 43P and 44P via signal ports 92 and 94, respectively. It should be understood that the third term signals applied to phase shifters 42P–45P are of equal amplitude.

The signal applied to difference port 174 causes signals of equal amplitude and opposite phase to be provided at signal ports 100 and 106 and applied to sum ports 104 and 110, respectively. Because the signals applied to sum ports 100 and 106 are of opposite phase, third term signals of one phase are applied to phase shifters 47P and 48P via signal ports 112 and 114, respectively; third term signals of an opposite phase are applied to phase shifters 46P and 49P via signal ports 116 and 118, respectively. It should be understood that the third term signals applied to phase shifters 46P–49P are of equal amplitude. Moreover, since the signals applied to sum ports 76 and 78 are of equal amplitude all of the third term signals are of equal amplitude.

The third term signals applied to phase shifters 42P–49P are represented by signal vectors 42U–49U, respectively, (FIG. 4, illustration (*b*)) which are of equal amplitude.

For reasons given hereinbefore, when power associated with the third excitation signal is applied to sum port 162 (FIG. 3), a substantially equal amount of power is provided to phase shifters 42P–49P. The third term signals are in accordance with a third power relationship which is given as:

$$\int_{-\frac{L}{2}}^{\frac{L}{2}} E_2^2 \cos^2 \frac{4\pi X}{L} \, dX = A_2^2 \quad (13)$$

where $A_2$ is the amplitude of the third excitation signal. The value of the coefficient, $E_2$, is determined by solving the third power relationship (13), whereby:

$$E_2 = A_2/2 \quad (14)$$

By substituting the term $A_2/2$, for the coefficient, $E_2$, in the third term relationship (12), the third term of the Fourier cosine series is alternatively given as:

$$F_2(X) = (A_2/2) \cos (4\pi X/L) \quad (15)$$

It should be appreciated that the relative amplitudes of the signals representative of the terms of the Fourier cosine series are adjusted to desired relative values by selecting the amplitudes of the first, second and third excitation signals. Therefore, the amplitudes of the first, second and third excitation signals may be chosen to provide the pattern of excitation that causes the wave energy to emanate from all of radiators 14–21 to form the beam that has the intensity which approximates the cosecant square function.

It should be understood that when only the first term signals are applied to phase shifters 42P–49P, a discrete signal representation of a rectangular pulse is provided to radiators 14–21. Since the discrete Fourier transform of a rectangular pulse is a unit impulse, first term signals cause excitation to be provided to a selected one of radiators 14–21; the selection is in accordance with phase shifts provided by phase shifters 42P–49P. Therefore, distribution network 56 and phase shifters 42P–49P are operable to cause the wave energy to emanate from a selected one of radiators 14–21.

Although a three way divider of any suitable type may be used to provide the excitation signals, in this embodiment three way divider 54 is comprised of a pair of two way power dividers. A first two way power divider 176 includes a directional coupler 178 that has a first input port 180 connected to the transmitter thereby causing a signal from the transmitter to be applied to directional coupler 178. A second input port 182 of directional coupler 178 is connected to a termination resistor 184, whereby no signal is applied to second input port 182.

First and second output ports 186 and 188 of directional 178 are coupled to a directional coupler 190 at a first input port 192 and a second input port 194 through reciprocal phase shifters 196 and 198, respectively. Phase shifters 196 and 198 are similar to phase shifters 42P–49P described hereinbefore.

Phase shifters 196 and 198 introduce phase shifts that are negatives of each other. When, for example, phase shifter 196 introduceds a phase shift of +10°, phase shifter 198 introduces a phase shift of −10°. The phase shifts introduced by phase shifters 196 and 198 are in response to signals from the computer.

In response to the signal from the transmitter, a first output port 200 and a second output port 202 provide cophased signals of relative amplitudes that are a function of the phase shifts introduced by phase shifters 196 and 198.

Second output port 202 is connected to a two way power divider 204 similar to two way divider 176 described hereinbefore. Output ports of power divider 204 are connected to ports 57 and 58 whereby the first and second excitation signals are provided to distribution network 56.

First output port 200 is coupled to signal port 59 through a delay line 206 which provides a phase delay selected to cause the third excitation signal to be cophased with the first and second excitation signals.

What is claimed is:

1. In an antenna feed system where an orthogonal beam matrix connected to a plurality of radiators provides excitation signals thereto representative of a discrete Fourier transform of an even function in response to inverse transform signals representative of said function, the improvement comprising:
   - circuit means for providing a group of signals representative of values of the amplitude of said function as approximated by the first three terms of a Fourier cosine series in response to a signal from a transmitter; and
   - phase shifting means for causing signals of said group to have phase shifts relative to each other that correspond to phase shifts of said values, whereby said phase shifting means provides said inverse transform signals.

2. The feed system of claim 1 wherein said circuit means comprises:
   - a variable power divider that provides first, second and third cophased excitation signals proportional to the amplitude of the first, second and third terms, respectively, of said Fourier series; and
   - a distribution network connected to said power divider that provides signals representative of values of the amplitude of said first, second and third terms in response to said first, second and third excitation signals, respectively, said distribution network being substantially lossless whereby power provided by said power divider is applied to said phase shifting means.

3. The feed system of claim 2 wherein said phase shifting means includes first and second pairs of phase shifters respectively connected to first and second pairs of radiators, said distribution network comprising:
   - a first magic TEE network having first and second signal ports respectively connected to ones of said first pair of phase shifters;
   - a second magic TEE network having respectively first and second signal ports respectively connected to ones of said second pair of phase shifters;
   - a third magic TEE network having signal ports respectively connected to a sum port of said first magic TEE and to a sum port of said second magic TEE, signals proportional to said first and second excitation signals being applied to a sum port and to a difference port, respectively, of said third magic TEE; and
   - a directional coupler having first and second output ports coupled to the difference port of said first magic TEE and the difference port of said second magic TEE, respectively, said second excitation signal being applied to an input port of said directional coupler.

* * * * *

UNITED STATES PATENT AND TRADEMARK OFFICE
CERTIFICATE OF CORRECTION

PATENT NO. : 4,122,453

DATED : October 24, 1978

INVENTOR(S) : Charles Edward Profera

It is certified that error appears in the above-identified patent and that said Letters Patent is hereby corrected as shown below:

Column 2, line 14 insert --Figure 4 is a schematic of signal vectors used to describe the invention.--

Signed and Sealed this

*Sixteenth* Day of *January 1979*

[SEAL]

*Attest:*

RUTH C. MASON
*Attesting Officer*

DONALD W. BANNER
*Commissioner of Patents and Trademarks*